(No Model.)
H. M. SAINT-DENIS.
CENTRIFUGAL DRIER.
No. 510,298. Patented Dec. 5, 1893.
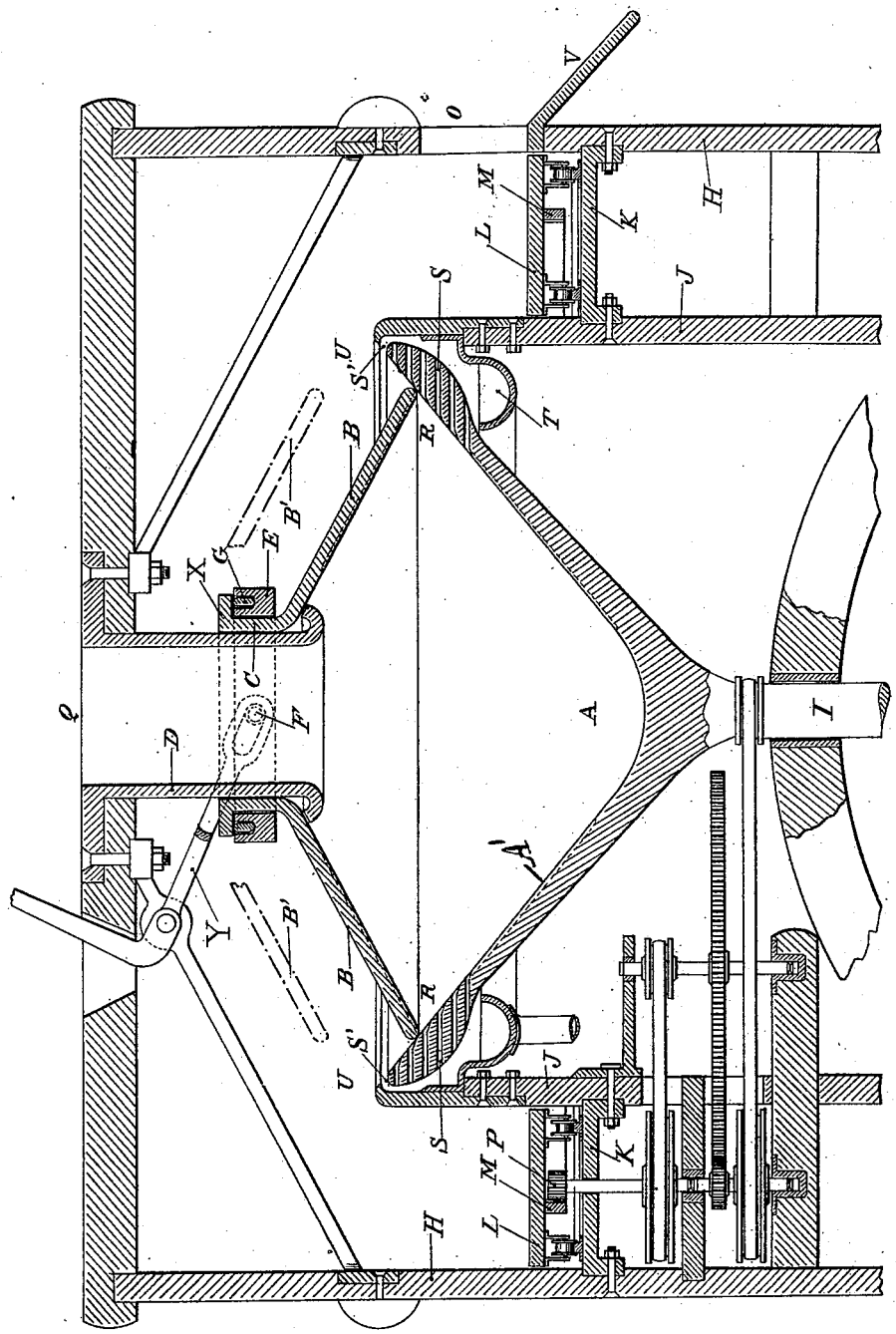
Witnesses:
F. T. Chapman
Fannie Wise
Inventor,
Henri M. Saint-Denis,
By Joseph Lyons
Attorney.
THE NATIONAL LITHOGRAPHING COMPANY,
WASHINGTON, D. C.

UNITED STATES PATENT OFFICE.

HENRI MICHEL SAINT-DENIS, OF PARIS, FRANCE.

CENTRIFUGAL DRIER.

SPECIFICATION forming part of Letters Patent No. 510,298, dated December 5, 1893.

Application filed August 8, 1890. Serial No. 361,472. (No model.) Patented in France January 7, 1890, No. 202,941, and in England July 11, 1890, No. 10,788.

*To all whom it may concern:*

Be it known that I, HENRI MICHEL SAINT-DENIS, of Paris, France, have invented certain new and useful Improvements in Centrifugal Drying-Machines or Hydro-Extractors, (which were patented in France under date of January 7, 1890, No. 202,941, and in Great Britain under date of July 11, 1890, No. 10,788,) of which the following is a specification.

This invention has reference to improvements in centrifugal drying machines in which the material to be dried is contained in a revolving vessel fitted with a cover capable of being lifted from the vessel so that the material may be discharged by centrifugal force.

In my improved machine, the walls of the containing vessel are provided with perforations near and around the upper edge, and the inner surface of the vessel is provided with grooves leading to these perforations; also the cover of the vessel is capable of revolving therewith; it is guided by a stationary hopper which passes through the cover and serves as a journal for the latter and through this hopper the material to be treated is fed to the containing vessel while the same rotates with the cover.

The annexed drawing is a vertical section of the machine in its preferred construction. It is composed of a basin-shaped vessel A preferably hyperbolic in the interior but I am not necessarily confined to this shape. The inside of this vessel has a number of grooves A' in the line of the hyperbolic curve and along the bottom of the grooves is a series of holes in the sides of the vessel, these holes being either all along the grooves or only at and near the upper or widest part of the vessel as shown in the figure, this part being preferably made somewhat thicker. The vessel A is fixed to the top of a vertical shaft I which is driven by any suitable power. The vessel is fitted with a cover B of truncated conical form, but this form is not essential, neither is the particular inclination of its sides, and it may be grooved or not. The upper part of the cover is formed in a piece with a collar C having at its upper edge an outturned flange X which rests on rollers G. The collar embraces a hollow cylinder or hopper D through which the material to be treated is supplied to the vessel A. When the vessel is caused to rotate by means of the vertical driving shaft the cover B together with the flanged collar, is, by contact with the vessel, caused to rotate around the hollow feed cylinder D which is fixed to the frame of the machine. The rollers G which form the bearings to the flanged collar of the cover are situated in a recess or mortise in a ring E which at the will of the attendant can be lifted by means of a forked lever Y or other analogous device. Consequently when this ring is lifted the cover B is lifted also.

Around the vessel are two concentric frames H and J between which is a small circular railway the rails of which rest on supports K. A circular platform or table L is put in motion on the railway by means of a circular rack M and a pinion P which latter receives its motion from the vertical driving shaft through the intermediation of a series of toothed wheels, pulleys and belts as shown, or it may be otherwise driven by any suitable device dependent upon or independent from the vertical driving shaft. At one part of the outer concentric frame H is an opening O below which is an inclined board or chute V.

The machine works as follows:—The attendant stands on a platform level with the top of the machine and feeds the material, say wool, through the top Q of the hollow cylinder D. The wool falls into the vessel A but the centrifugal force assisted by the inclination of the sides causes it to rise to R, that is to say to the upper part of the vessel where it is forced against the walls of the vessel and cover. The feed of wool being continued, successive and approximately perpendicular layers are formed until the quantity supplied is considered sufficient, when the attendant stops the feed. The mass of wool rotates with the vessel and cover and by the rapid rotary motion thereof the liquid or moisture with which the wool is impregnated leaves it and is thrown toward the sides of the vessel and cover, the grooves of which it follows, and escapes from the vessel by the holes S therein and over the edge S'. The liquid is collected in a circular gutter T. When the attendant considers that the wool is sufficiently dried he moves the forked lever Y so that the cover B is raised vertically, its rotation still continuing on account of the momentum it has acquired. The cover reaches the height B' and leaves a circular opening U between itself and the vessel through which the wool escapes owing to the centrifugal force assisted by the inclination of the sides of the vessel and falls in a sheet upon the circular platform L.

It will be readily understood that instead of the means shown for lifting the cover, any of the well-known automatic devices for this purpose may be employed.

The wool having escaped from the vessel A the lever Y or other device for lifting the cover B is immediately returned to position. The vessel is therefore again closed and can be again charged. To facilitate the feed the hollow charging cylinder may be fitted with a funnel. The movable circular table and the gearing for driving it are not indispensable; if dispensed with the dried material will fall on the ground.

What I claim, and desire to secure by Letters Patent, is—

1. In a centrifugal drying machine a flaring vessel mounted for rotation upon a vertical axis, and provided with perforations near and around its upper edge, and with grooves on the inner surface, leading to said perforations, substantially as described.

2. In a centrifugal drying machine, a vessel having a hyperbolic inner surface, mounted for rotation about its vertically placed axis, said vessel being provided with perforations near and around its upper edge and with grooves on the inner surface leading to said perforations, substantially as described.

3. In a centrifugal drying machine, the combination of a rotatable containing vessel, a stationary hopper leading thereto, and a rotatable cover for the vessel journaled on and movable along said hopper, substantially as described.

4. In a centrifugal drying machine, the combination of a flaring vessel mounted for rotation upon a vertical axis and provided with suitable perforations for the escape of the fluids acted upon; with a cover normally resting upon the vessel, a stationary hopper communicating with the cover and vessel and constituting a journal bearing for the cover, and a lever for raising and lowering the cover along the hopper, substantially as described.

In testimony whereof I have signed my name to this specification in the presence of two subscribing witnesses.

HENRI MICHEL SAINT-DENIS.

Witnesses:
BASSETTE,
F. CANNOGLE.